Patented May 19, 1931

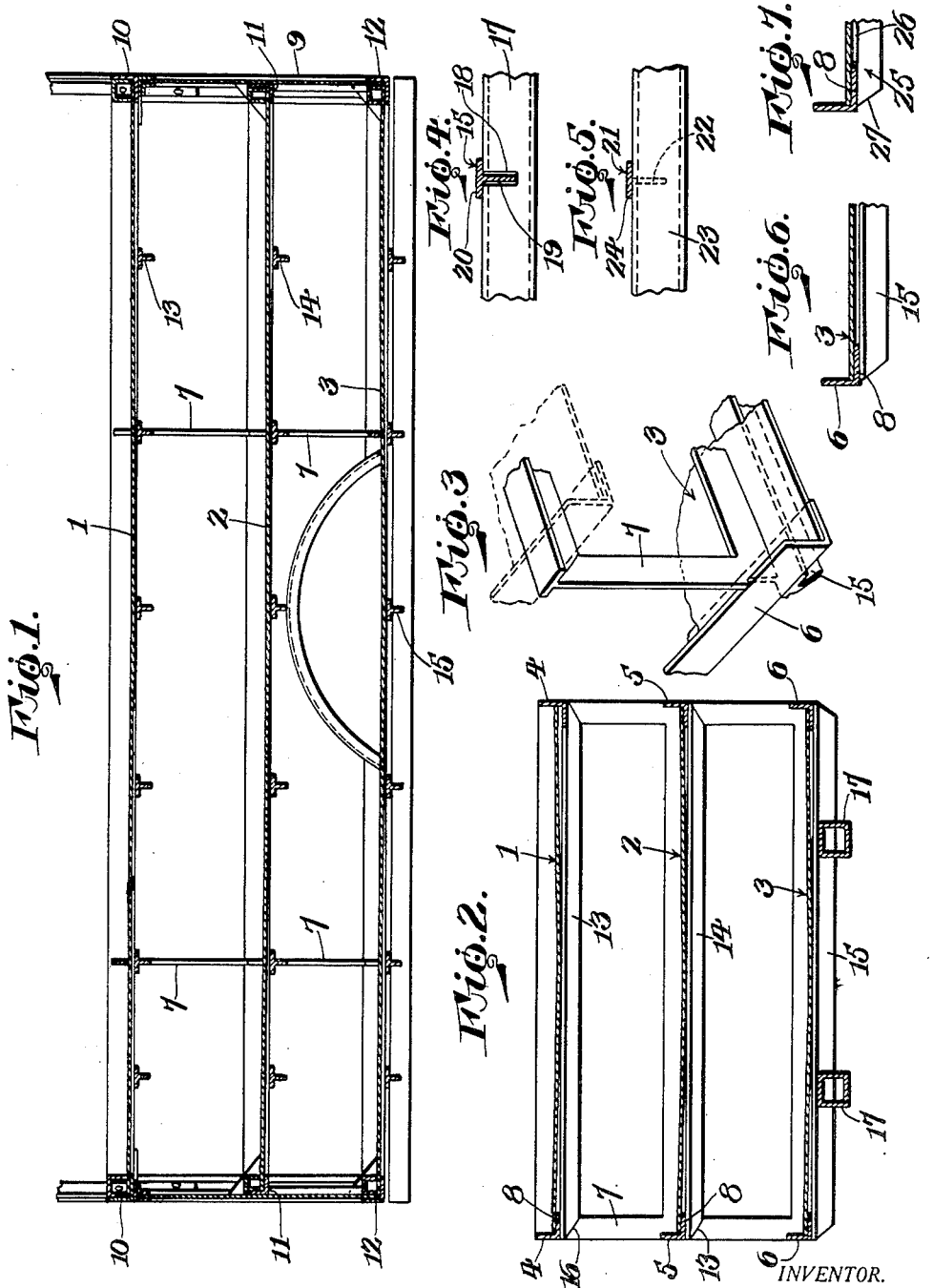

1,806,429

UNITED STATES PATENT OFFICE

SIMEON E. TRAVIS, JR., OF HATTIESBURG, MISSISSIPPI, ASSIGNOR TO THE WELDMECH STEEL PRODUCTS CO., A CORPORATION OF MISSISSIPPI

UNDERFRAME FOR TRUCK BODIES

Original application filed January 26, 1928, Serial No. 249,693. Divided and this application filed March 5, 1929. Serial No. 344,532.

This invention relates to a truck body having one or more decks of that type designed primarily for the handling of crated, cased or boxed bottled goods, in a division of my application filed January 26, 1928, Serial No. 249,693, and the invention has for its object to provide, in a manner as hereinafter set forth, a new and novel form of underframe for reinforcing the bottom of the truck body and with the underframe so constructed and arranged to permit of the truck body being attached to any form of chassis, and further with the underframe acting to prevent sagging of the bottom of the truck body, or when the truck body is formed with plural decks to prevent sagging of the floor of the lowermost deck.

Further objects of the invention are to provide, in a manner as hereinafter set forth, an underframe for a truck body which is simple in its construction and arrangement, strong, durable, compact, readily installed with respect to the bottom of the truck body, of minimum weight and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view in longitudinal section illustrating an underframing, in accordance with this invention installed with respect to the bottom of the truck body.

Figure 2 is a transverse sectional view of a truck body showing the adaptation therewith of an underframing in accordance with this invention.

Figure 3 is a fragmentary view in perspective illustrating a portion of the underframing.

Figure 4 is a fragmentary view in section illustrating a portion of the underframing.

Figure 5 is a view similar to Figure 4 of a modified arrangement.

Figure 6 is a sectional detail.

Figure 7 is a sectional detail illustrating a modified arrangement of one of the elements of the underframing.

The truck body is illustrated with an upper deck 1, an intermediate deck 2 and a lower deck 3. The specific manner of setting up the decks of the truck body will not be referred to herein, as it is fully set forth in my application aforesaid, however, reference will be briefly made to certain of the decks and specifically made to the elements of the lower deck which coact with elements of the invention forming the subject matter of this application. The deck 1 includes a pair of side rails 4, the deck 2 a pair of side rails 5 and the deck 3 a pair of side rails 6. Spacing and supporting elements 7 are interposed between the decks 1 and 2 and the decks 2 and 3. Each of the side rails is of angle-shaped cross section and is set up with an inwardly extending, horizontally disposed leg. Each pair of side rails is oppositely disposed.

Common to the decks are vertically disposed corner rails 9. The deck 1 includes a pair of end rails 10, deck 2 a pair of end rails 11 and the deck 3 a pair of end rails 12. Each of the end rails is of angle-shape and includes an inwardly extending, horizontally disposed leg. Each pair of end rails is oppositely disposed. Secured against the lower faces of the horizontal legs 8 of the side rails 4 are spaced brace members 13 which are disposed transversely and of T-shaped cross section. Secured to the horizontal legs of the side rails 5 are brace members 14 which are disposed transversely and of T-shaped cross section. Secured to the horizontal legs 8 of the side rails 6 are brace members 15 of T-shaped cross section. The ends of certain of the brace members are beveled as at 17 and are welded to the element 7. The other brace members have their ends also beveled but are not welded to the elements 7, and these latter are seated on and secured to the vertical legs of the side rails 5, 6 and are also positioned on the flooring of the decks 2, 3, With reference to Figures 1, 2 and 4 longitudinally disposed sub-sills 17 are positioned below the bottom of the flooring of the deck 3. A pair of sub-sills is employed and arranged in spaced relation. The sub-sills 17 are co-extensive with the length of the truck body and each sub-sill 17 is disposed between the longitudinal median and one side edge of the truck body. Each sub-sill 17 is formed with a series of spaced, transversely extending channels 18 which correspond in number to the number of the brace members 15. The channels 18 open at the top of the sub-sill. The channels 18 in one sub-sill align with the channels 18 in the other sub-sill. The stems 19 of the brace members 15 extend through the channels 18 and are welded to the sub-sills. The heads 20 of the brace members 15 seat on the top surface of the sub-sills and are welded thereto.

Referring to the modification shown in Figure 5 a modified form of T-shaped brace is shown and indicated at 21. The brace 21 has its stem 22 formed with spaced apertures opening at the bottom thereof. In Figure 5 a modified form of sub-sill 17 is shown and which is passed through the apertures in the stem 22. The head of the brace 21 which is indicated at 24 is seated upon the top surface of the sub-sill 23. The brace 21 and sub-sill 23 are welded together.

In the form shown in Figure 7 the T-shaped brace 25 has a portion of its head 26 cut away at each end, whereby the ends 27 of the brace will be secured to the lower faces of the horizontal legs of the side rails, and the head 26 of the brace secured to the lower face of the flooring.

The sub-sills are of like construction, hollow throughout and preferably of polygonal cross section. The sub-sills are of materially greater height than that of the stems 19 and 22 of the T-braces. When the sub-sills are secured with the truck body the upper faces thereof are spaced from the lower face of the bottom of the truck body. This is provided for by the interposition of the heads of the braces between the sills and the flooring of the lower deck.

What I claim is:

1. A truck body comprising an upper, an intermediate and a lower deck, each of said decks including side and end rails of angle-shaped cross section to provide vertical and horizontal legs and with the latter extending inwardly from the inner end of the former, corner rails common to the side and end rails of said decks, each of said decks including a flooring connected to said horizontal legs, transversely extending, spaced brace members of T-shaped cross section secured to and depending from the lower faces of said floorings, and spaced sub-sills extending longitudinally with respect to the lower face of the flooring of the lowermost of said decks, said sub-sills secured to the heads of the braces which depend from the flooring of the lowermost of said decks.

2. A truck body comprising a bottom having oppositely disposed angle-shaped side rails and a flooring secured upon the upper faces of the horizontal portions of said rails, spaced, parallel, T-shaped transversely extending braces, each having its head of less length than its stem, the stems of said braces projecting laterally from each end of the heads thereof and secured to the lower faces of said horizontal portions, said heads abutting the lower face of said flooring, and spaced, parallel sub-sills disposed at right angles to and secured to the heads of said braces.

In testimony whereof, I affix my signature hereto.

SIMEON E. TRAVIS, JR.